United States Patent
Acharya et al.

(10) Patent No.: US 11,222,619 B2
(45) Date of Patent: Jan. 11, 2022

(54) SOUND ABSORPTION PANEL

(71) Applicant: Nexcem Inc., Burlington (CA)

(72) Inventors: Vipul Vipinchandra Acharya, Burlington (CA); John Paul deGraauw, Stratford (CA)

(73) Assignee: Nexcem Inc., Burlington (CA)

( * ) Notice: Subject to any disclaimer, the term of this patent is extended or adjusted under 35 U.S.C. 154(b) by 606 days.

(21) Appl. No.: 16/150,462

(22) Filed: Oct. 3, 2018

(65) Prior Publication Data

US 2019/0108825 A1    Apr. 11, 2019

Related U.S. Application Data

(60) Provisional application No. 62/568,568, filed on Oct. 5, 2017.

(51) Int. Cl.
| | |
|---|---|
| *G10K 11/168* | (2006.01) |
| *E01B 19/00* | (2006.01) |
| *E01F 8/00* | (2006.01) |
| *E04B 1/86* | (2006.01) |
| *G10K 11/165* | (2006.01) |
| *G10K 11/172* | (2006.01) |
| *B32B 9/04* | (2006.01) |

(Continued)

(52) U.S. Cl.
CPC .......... *G10K 11/168* (2013.01); *E01B 19/003* (2013.01); *E01F 8/0029* (2013.01); *E04B 1/86* (2013.01); *G10K 11/165* (2013.01); *G10K 11/172* (2013.01); *B32B 9/042* (2013.01); *B32B 19/02* (2013.01); *B32B 21/02* (2013.01); *B32B 2307/102* (2013.01); *B32B 2307/72* (2013.01); *B32B 2607/00* (2013.01)

(58) Field of Classification Search
CPC .. G10K 11/165; G10K 11/168; G10K 11/172; E04B 1/86; E01F 8/0029; B32B 9/042; B32B 19/02; B32B 21/02; B32B 2307/102; B32B 2307/72; B32B 2607/00
USPC ........................................................ 181/290
See application file for complete search history.

(56) References Cited

U.S. PATENT DOCUMENTS

| | | |
|---|---|---|
| 2,007,130 A | 7/1935 | Munroe |
| 2,021,359 A | 11/1935 | Halstead |

(Continued)

FOREIGN PATENT DOCUMENTS

| | | |
|---|---|---|
| CN | 201495500 | 6/2010 |
| CN | 202131570 | 2/2012 |

(Continued)

OTHER PUBLICATIONS

United Kingdom Combined Search and Examination Report issued in connection with related United Kingdom Patent Application No. GB1816119.0, dated Mar. 29, 2019 (9 pages).

(Continued)

*Primary Examiner* — Forrest M Phillips
(74) *Attorney, Agent, or Firm* — Dentons US LLP

(57) ABSTRACT

An acoustic sound absorptive panel or block is provided that is made from a plurality of materials and volumes selected such that each discrete volume of material has a sufficiently different sound absorption profile, resulting in a system that provides better overall sound absorption of traffic noise from motorways and railways in a practical and cost-efficient manner.

21 Claims, 12 Drawing Sheets

(51) Int. Cl.
*B32B 19/02* (2006.01)
*B32B 21/02* (2006.01)

(56) References Cited

U.S. PATENT DOCUMENTS

| | | | | |
|---|---|---|---|---|
| 3,965,633 | A * | 6/1976 | Carroll | E04B 7/00 |
| | | | | 52/309.8 |
| 4,094,380 | A * | 6/1978 | Kobayashi | E01F 8/0029 |
| | | | | 181/285 |
| 4,607,466 | A * | 8/1986 | Allred | G10K 11/168 |
| | | | | 181/284 |
| 4,614,553 | A * | 9/1986 | Allred | G10K 11/168 |
| | | | | 156/256 |
| 4,899,498 | A * | 2/1990 | Grieb | E01F 8/0017 |
| | | | | 52/144 |
| 8,684,135 | B2 * | 4/2014 | Smith | G10K 11/162 |
| | | | | 181/294 |
| 2004/0065506 | A1 | 4/2004 | Salls | |
| 2008/0289901 | A1 | 11/2008 | Coury | |
| 2011/0203202 | A1 * | 8/2011 | Uhl | E04B 2/8635 |
| | | | | 52/220.1 |

FOREIGN PATENT DOCUMENTS

| | | | |
|---|---|---|---|
| CN | 104695291 | 6/2015 | |
| CN | 108396600 | 8/2018 | |
| DE | 19839823 | 3/1999 | |
| EP | 2431170 A1 * | 3/2012 | ........... B44C 5/0461 |
| FR | 2704015 | 10/1994 | |
| JP | 2703274 | 1/1998 | |
| JP | 3748153 | 5/1999 | |
| NL | 8103852 | 3/1983 | |

OTHER PUBLICATIONS

Australia Office Action dated May 16, 2019 in related Application No. 2018241138 filed Oct. 4, 2018 (10 pages).
Australia Office Action dated Mar. 3, 2020 in related Application No. 2018241138 filed Oct. 4, 2018 (5 pages).
Australia Office Action dated Apr. 15, 2020 in related Application No. 2018241138 filed Oct. 4, 2018 (6 pages).
Canada Office Action dated Oct. 7, 2019 in related Application No. 3018714 filed Sep. 26, 2018 (3 pages).
United Kingdom Office Action dated Feb. 4, 2020 in related Application No. 1816119.0 filed Oct. 3, 2018 (3 pages).

* cited by examiner

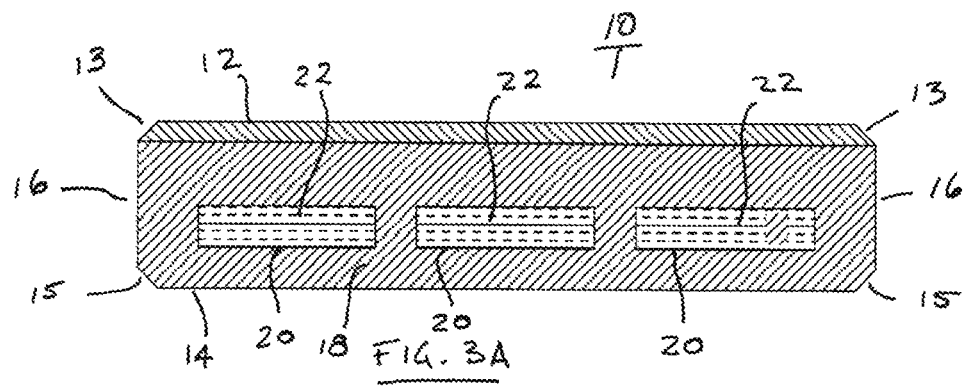
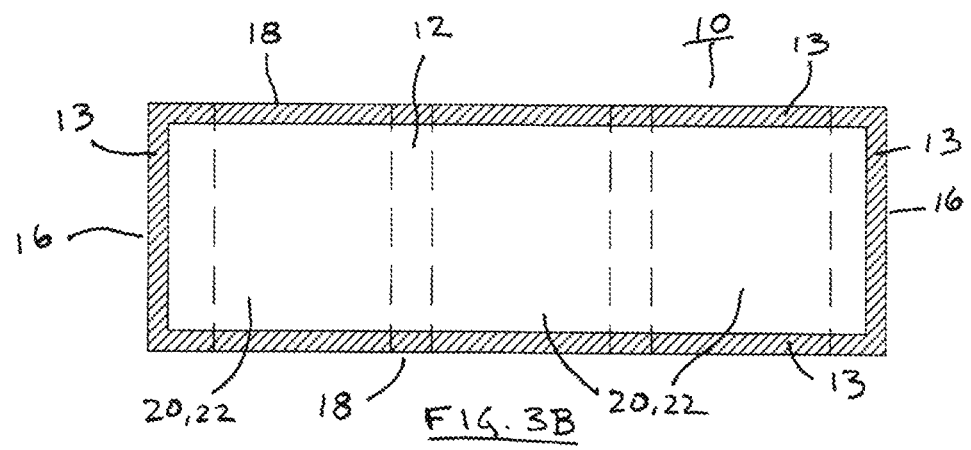
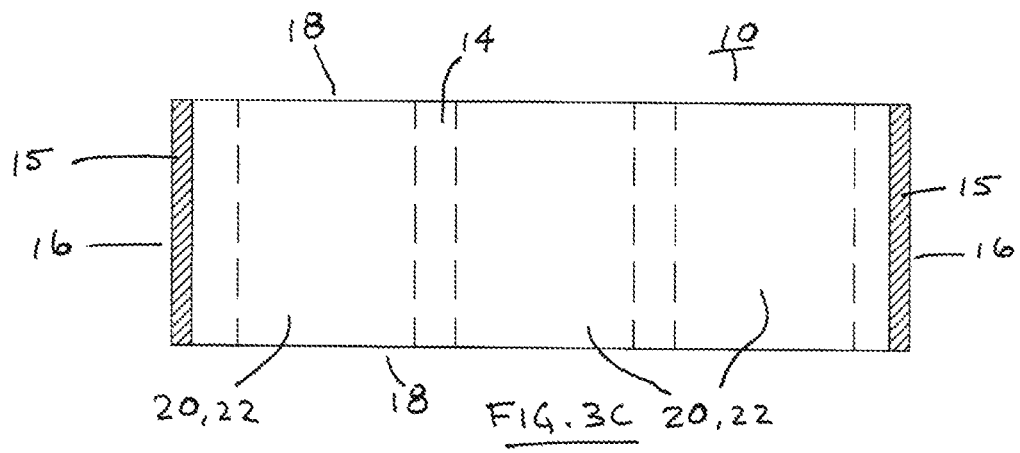
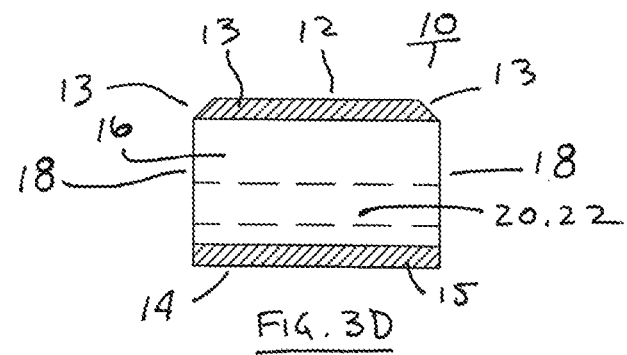

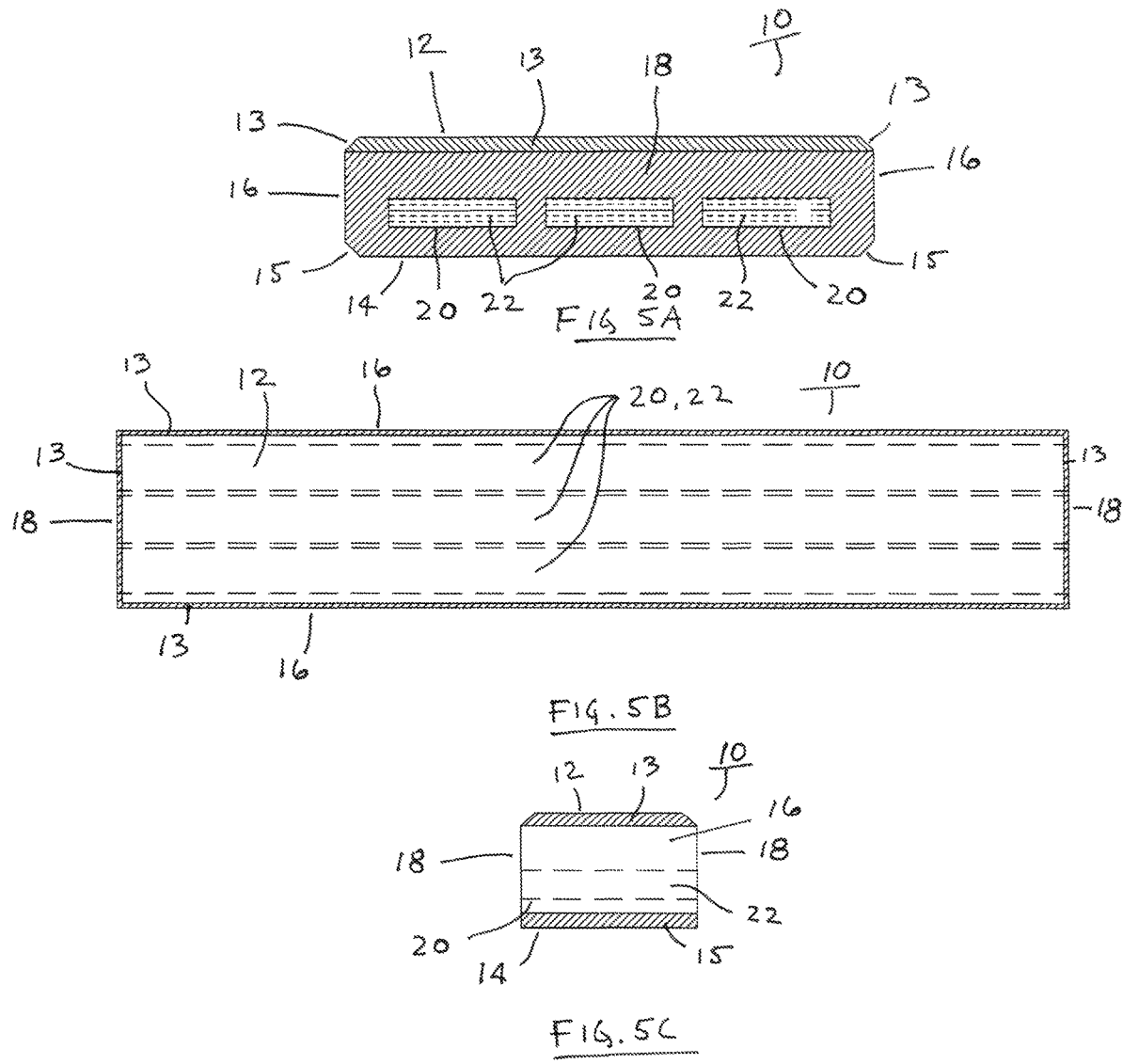

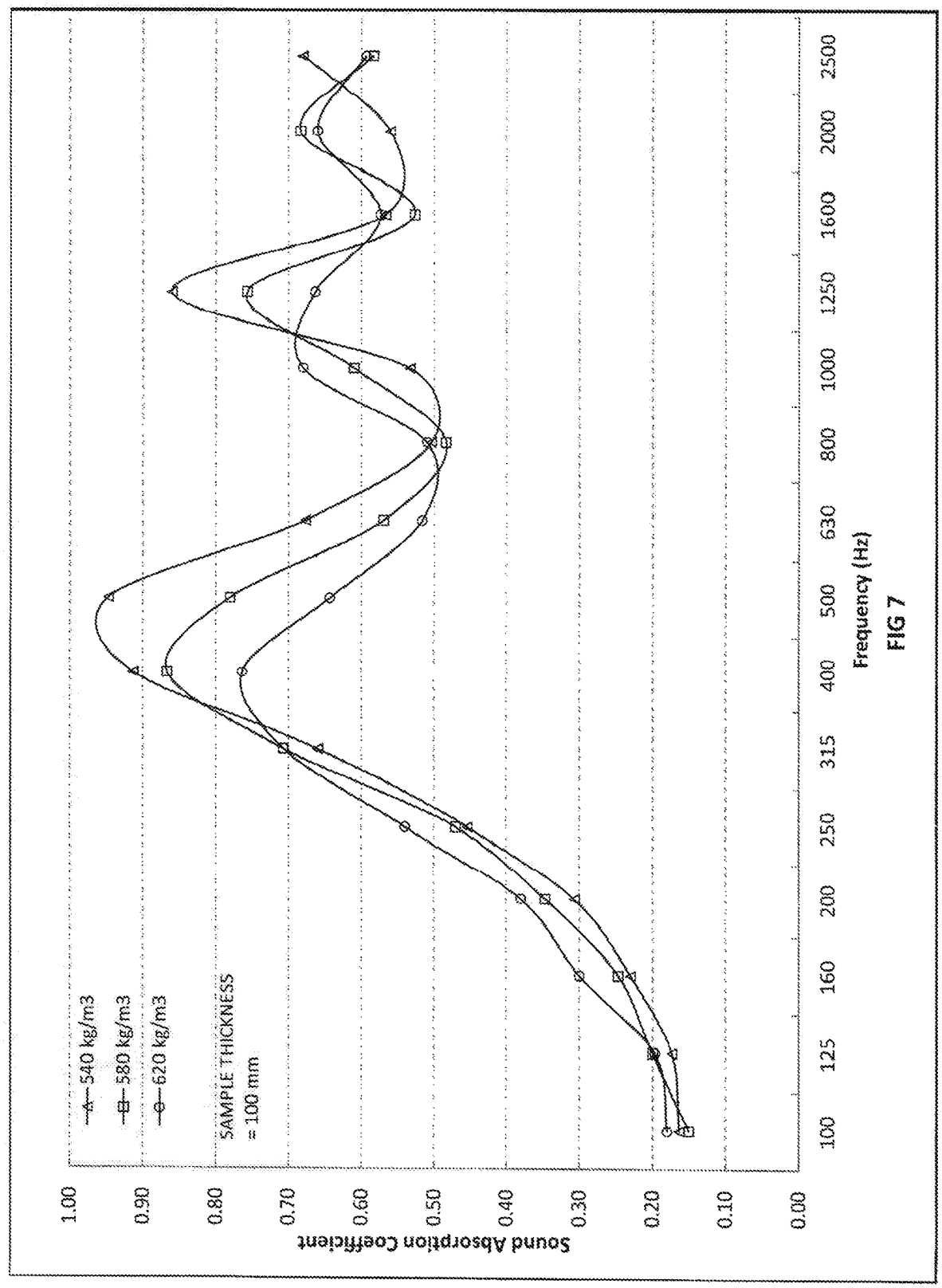

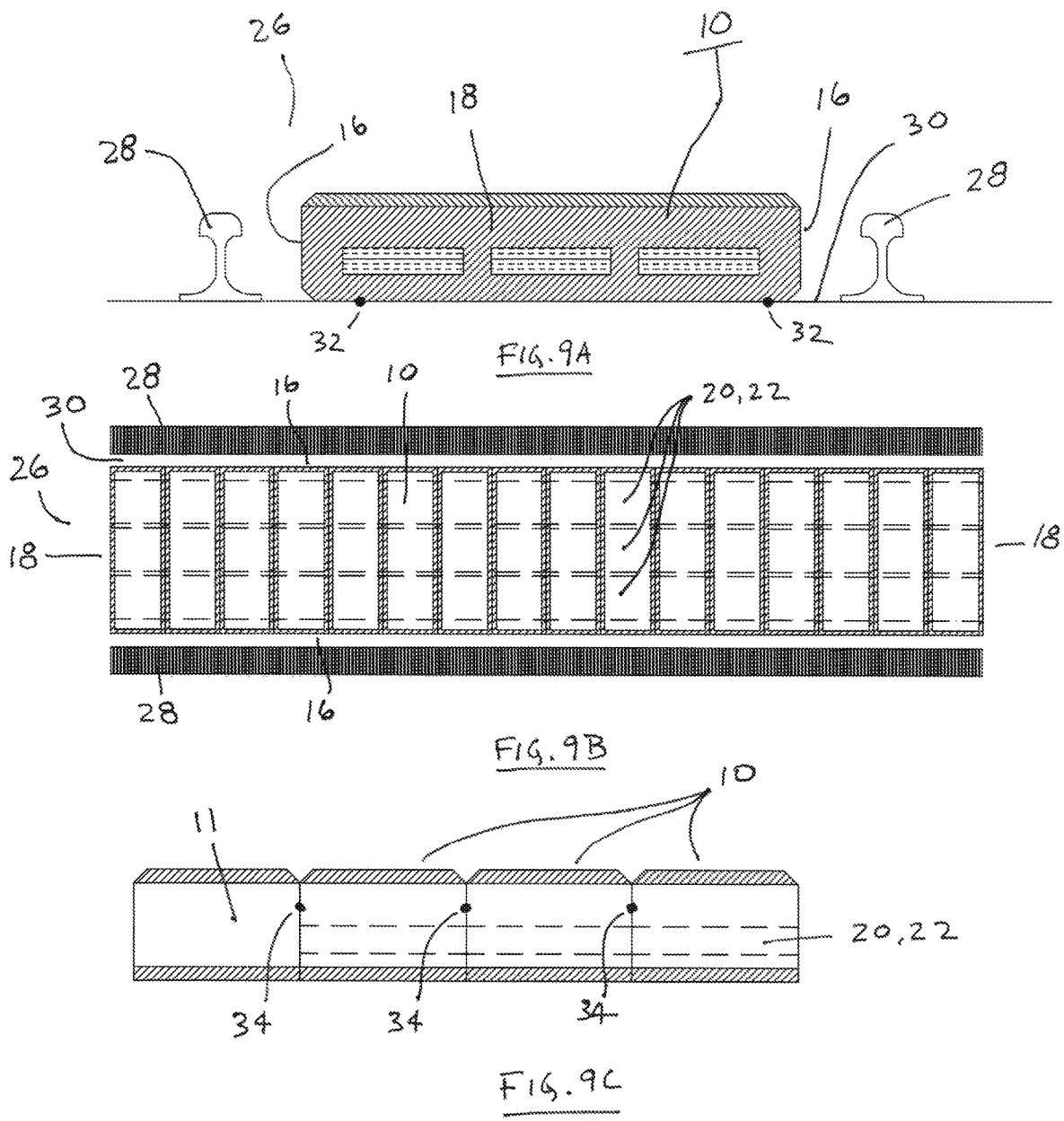

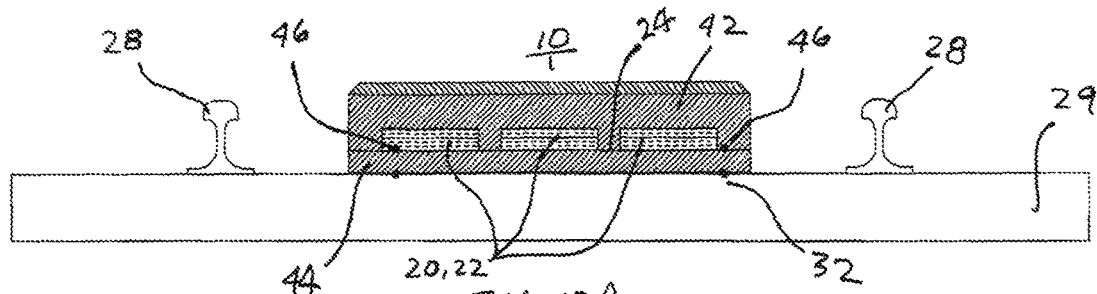
FIG. 12A
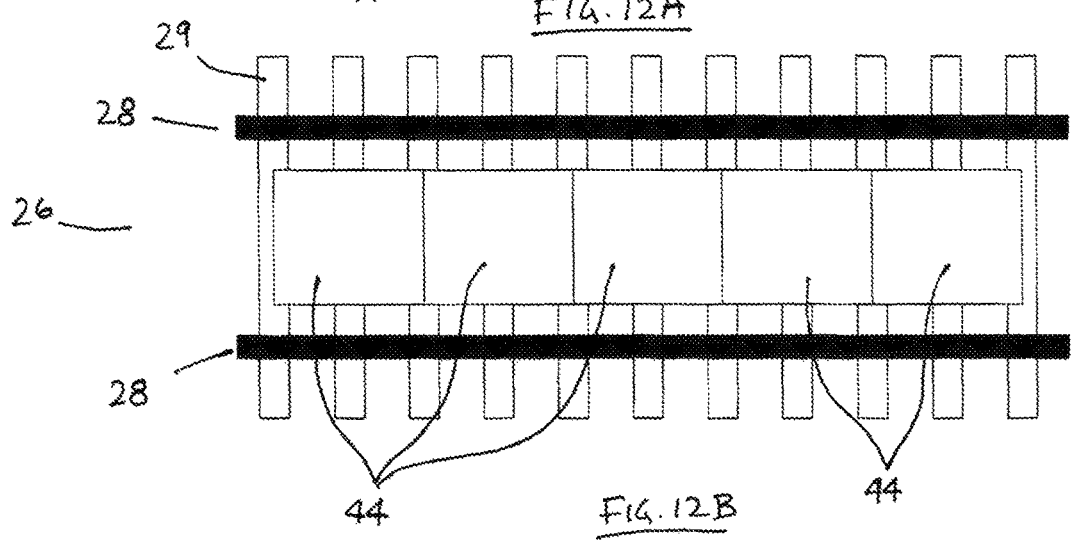
FIG. 12B
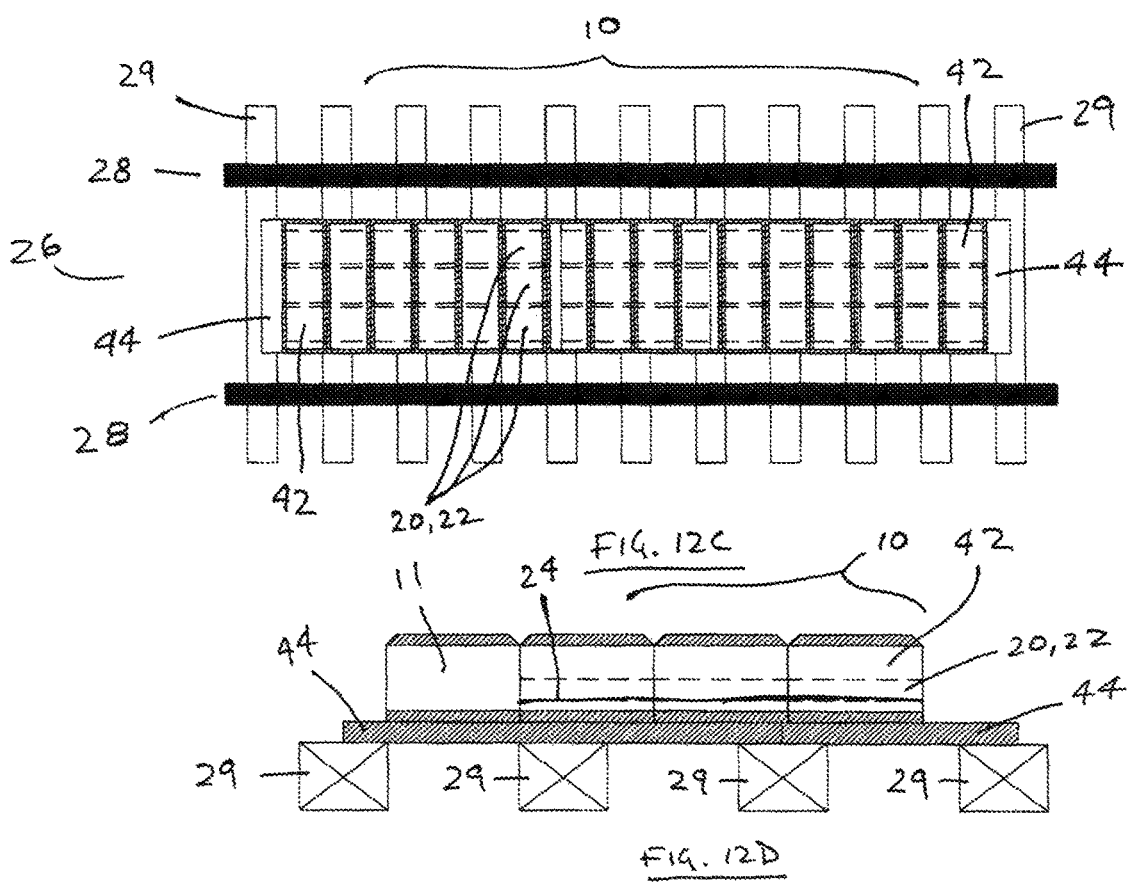
FIG. 12C
FIG. 12D

SOUND ABSORPTION PANEL

CROSS-REFERENCE TO RELATED APPLICATIONS

This application claims a benefit of priority to U.S. Provisional Patent Application Ser. No. 62/568,568 filed 5 Oct. 2017, which is herein incorporated by reference for all purposes.

TECHNICAL FIELD

This disclosure is related to sound absorption panels and, in particular, to sound absorption panels for use in reducing traffic noise from motorways and railways.

BACKGROUND

Sound panels comprised of a combination of cement-bonded wood fibre and concrete core/backing are known. However, the concrete core of such panels is not sound absorptive; it is there as structural support for the panel.

There may be such sound panels having a relief pattern, such as ribs or flutes, or cavities therein to create a type of anechoic chamber, however, they typically use air and only one material.

There may be probably concrete blocks with sound absorptive inserts disposed therein, however, the difference here is that the inserts are exposed directly to the sound for absorption; the concrete block is not absorptive. In addition, with the inserts exposed to the environment, they are not durable for exterior applications. Such panels are usually used in gymnasiums and interior applications only, not for exterior use on railway track systems to reduce traffic noise therefrom.

There also might be steel or concrete sound barriers with insulation on the inside, however, the outer layer is not sound-absorptive.

There are railway silencers made from cement bonded wood fibre or porous concrete or light weight concrete, however, they comprise either one material or one material and air.

It is, therefore, desirable to provide a sound absorption panel that overcomes the shortcomings of the prior art.

SUMMARY

Broadly stated, a sound absorption panel is provided for reducing acoustic noise emanating from railway traffic. In some embodiments, the sound absorption panel can comprise sound absorbing panels and blocks. More specifically, the sound absorption panel can comprise panels or blocks used for reducing the noise generated by trains, cars and other modes of transportation. Other applications of the sound absorption panel can include noise barriers along roads, railway silencers between railway tracks and other similar applications. In some embodiments, the sound absorption panel can comprise panels incorporating materials within the panel that have different sound absorption parameters such as parameters relating to the material's resonant frequency, density, thickness, volume, porosity and/or air-flow resistance.

In some embodiments, the sound absorption panel can possesses numerous benefits and advantages over known sound absorptive panels. In particular, the sound absorption panel can comprise materials that are sufficiently different from each other in respect of their respective sound absorption and durability characteristics.

Each material, and volume thereof, individually can have a nominal sound absorption coefficient with peak sound attenuation occurring at a small range of frequencies. Each material will also have durability and strength limits. If correctly chosen and assembled, the interaction of the sound passing through these multiple volumes, can result in: a) sound attenuation that is greater than the sum of the individual parts at a targeted frequency range; b) greater sound attenuation overall; and c) greater sound attenuation specifically at lower frequencies (typically identified as less than 250 Hz).

In addition, in some embodiments, having the inner volume protected by the exterior volume can allow for the use of less durable sound absorptive materials in the inner volume that are known to absorb lower frequency sound. For example, in some embodiments, the panel can be comprised of an outer volume of cement bonded wood fibre material, which can be durable, sound absorptive and permit the transfer of sound energy therethrough to the inner volume. In some embodiments, the upper layer of cement bonded wood fibre can be 100 mm in thickness. In some embodiments, there can be multiple inner volumes of a stone wool or mineral wool insulation material (such as Rockwool™ as manufactured by Rockwool International A/S of Hedehusene, Denmark) that is more sound absorptive than cement bonded wood fibre but not necessarily durable when exposed to exterior elements for prolonged periods of time. In some embodiments, there can be a third layer/volume of cement bonded wood fibre 50 mm thick disposed below the rock wool. The 2 sides of the rock wool insulation can also be protected in the assembly process with cement bonded wood fibre. The remaining sides can be protected by virtue of the installation process whereby one panel is placed adjacent to the next. The end panels can be capped with cement bonded wood fibre sheets to protect the inner volume. The resulting sound absorption of the combined assembly can be better than each individually (or the sum of each individual component) and, at the same time, provide the required overall durability and strength required for applications where the product is exposed to exterior weather, exterior structural loads such as pedestrian/vehicle traffic or wind, freeze-thaw, rain/moisture and snow.

By utilizing a different sound absorptive material, you can gain sound performance and can shift sound absorption to lower frequency range.

Broadly stated, in some embodiments, an acoustic silencing panel can be provided for absorbing railway or vehicular traffic noise, the panel comprising: a first layer of a first material comprising a first density; a second layer of a second material comprising a second density, the second density less than the first density; and at least two side panel members extending away from edges of the first layer, the at least two side panel members bounding the second layer therebetween.

Broadly stated, in some embodiments, one or more of the at least two side panel members can be substantially orthogonal to the first layer.

Broadly stated, in some embodiments, the first layer can comprise a thickness in a range of 50 mm to 100 mm.

Broadly stated, in some embodiments, the panel can further comprise a third layer disposed adjacent to the at least two side panel members, wherein the second layer is disposed between the first layer and the third layer.

Broadly stated, in some embodiments, the third layer can comprise the first material.

Broadly stated, in some embodiments, the third layer can comprise a density of at least 520 kg/m³, and further comprises a thickness of at least 50 mm.

Broadly stated, in some embodiments, a sound absorption panel can be provided for absorbing railway or vehicular traffic noise, the silencer comprising: a three-dimensional solid block of a first material comprising a first density; at least one cavity disposed through the block along one dimensional axis therethrough; and a second material of a second density disposed in the at least one cavity, wherein the second density is less than the first density.

Broadly stated, in some embodiments, the block can comprise a thickness in a range of 50 mm to 100 mm adjacent to the at least one cavity.

Broadly stated, in some embodiments, the first material can comprise one or more of concrete and cement bonded wood fibre ("CBWF").

Broadly stated, in some embodiments, the CBWF can comprise a density of at least 520 kg/m³.

Broadly stated, in some embodiments, the second material can comprise a sound-absorbing material.

Broadly stated, in some embodiments, the sound-absorbing material can comprise one or more of stone wool, mineral wool, fibreglass insulation and CBWF.

Broadly stated, in some embodiments, the panel can further comprise a structural frame.

Broadly stated, in some embodiments, the structural frame can be disposed adjacent to the panel.

Broadly stated, in some embodiments, the structural frame can be disposed within the panel.

Broadly stated, in some embodiments, the panel can be disposed within the structural frame.

DESCRIPTION OF DRAWINGS

FIG. 3A is an end elevation view depicting one embodiment of a sound absorption panel.

FIG. 3B is a top plan view depicting the sound absorption panel of FIG. 3A.

FIG. 3C is a bottom plan view depicting the sound absorption panel of FIG. 3A.

FIG. 3D is a side elevation view depicting the sound absorption panel of FIG. 3A.

FIG. 5A is and end elevation view depicting a third embodiment of a sound absorption panel.

FIG. 5B is a top plan view depicting the sound absorption panel of FIG. 5A.

FIG. 5C is a side elevation view depicting the sound absorption panel of FIG. 5A.

FIG. 7 is an X-Y chart depicting a comparison of sound absorption coefficients of three different densities of cement bonded wood fibre.

FIG. 9A is an end elevation view depicting one embodiment of a plurality of the sound absorption panel of FIG. 3A installed along between two rails along a railway track, where the axes of the cavities within the panel run parallel to the railway track.

FIG. 9B is a top plan view depicting the sound absorption panel of FIG. 9A.

FIG. 9C is a side elevation view depicting the sound absorption panel of FIG. 9A.

FIG. 12A is an end elevation view depicting an alternate embodiment of the sound absorption panel of FIG. 6A installed on a plurality of base panels disposed along a railway.

FIG. 12B is a top plan view depicting the base panels disposed along the railway of FIG. 12A.

FIG. 12C is a top plan view depicting the railway of FIG. 12B with the sound absorption panels disposed on the base panels.

FIG. 12D is a side elevation view depicting the sound absorption panels of FIG. 12C.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
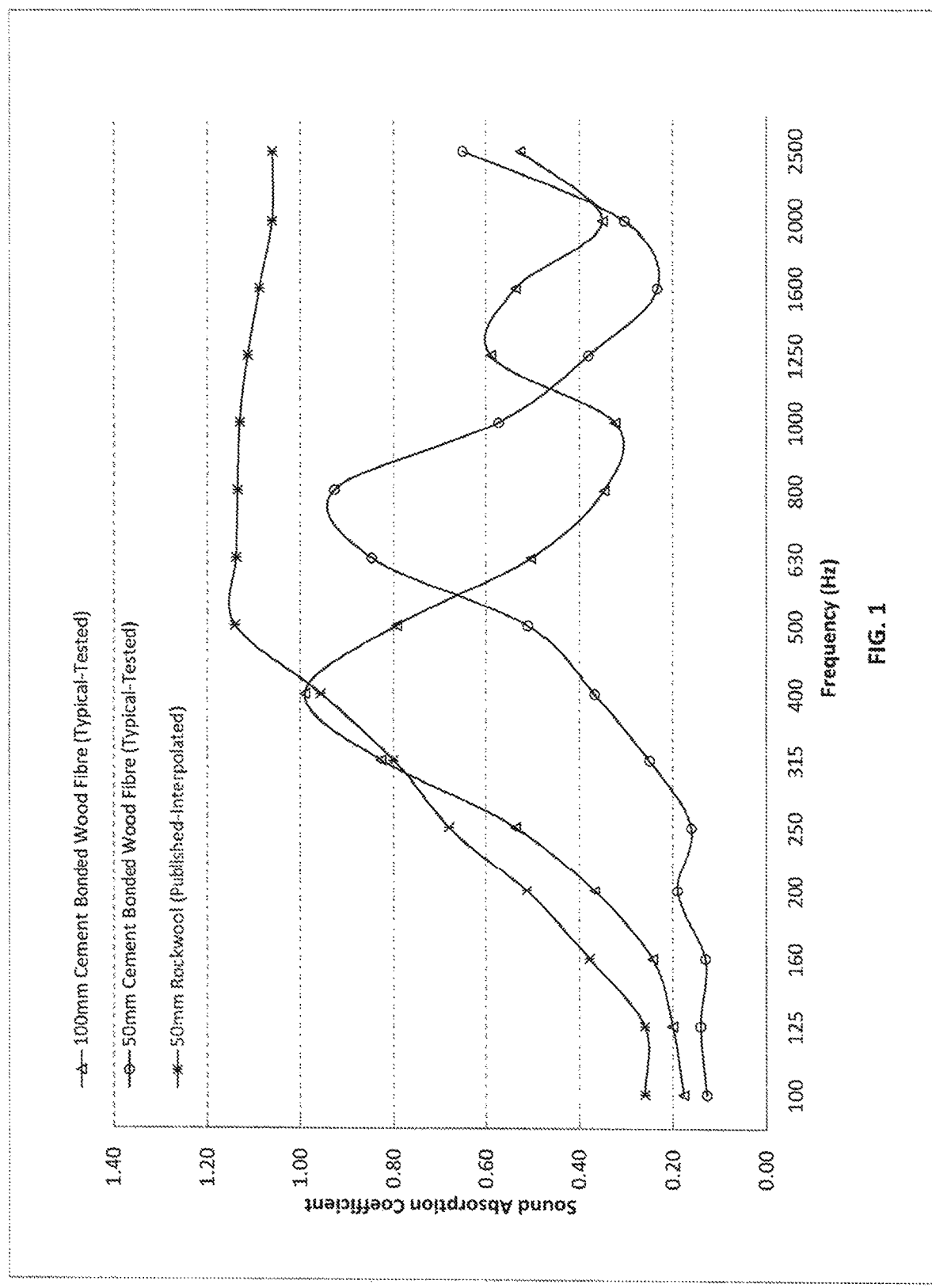
FIG. 1 is an X-Y chart depicting a comparison of sound absorption coefficients of three types of sound absorbing material as plotted against frequency.

Referring to FIG. 1, a typical 100 mm sample of cement bonded wood fibre at approx. 600 kg/m3 oven dry density is shown, and has an $NRC^1$=0.50, $SAA^2$=0.55 with peak sound absorption at approx. 300-500 Hz. Resonant Frequency of this material at 900 and 1800 Hz is observable as well.

A 50 mm sample of Rockwool™ insulation is shown in FIG. 1, has an NRC=1.0, SAA=0.98 with a peak sound absorption in the 400-500 Hz Range. It is known that Rockwool™ will reach a peak Sound absorption at frequency greater than 400 Hz and then maintain maximum Sound Absorption=1.0 for the remainder of the range. No observable resonant frequencies.

A typical 50 mm sample of cement bonded wood fibre at approximately 600 kg/m3 oven dry density is shown in FIG. 1, and has an NRC=0.40, SAA=0.44 with peak sound absorption at approx. 630-830 Hz. Resonant Frequency of this material at 1700 Hz is observable as well.

Figure 2:
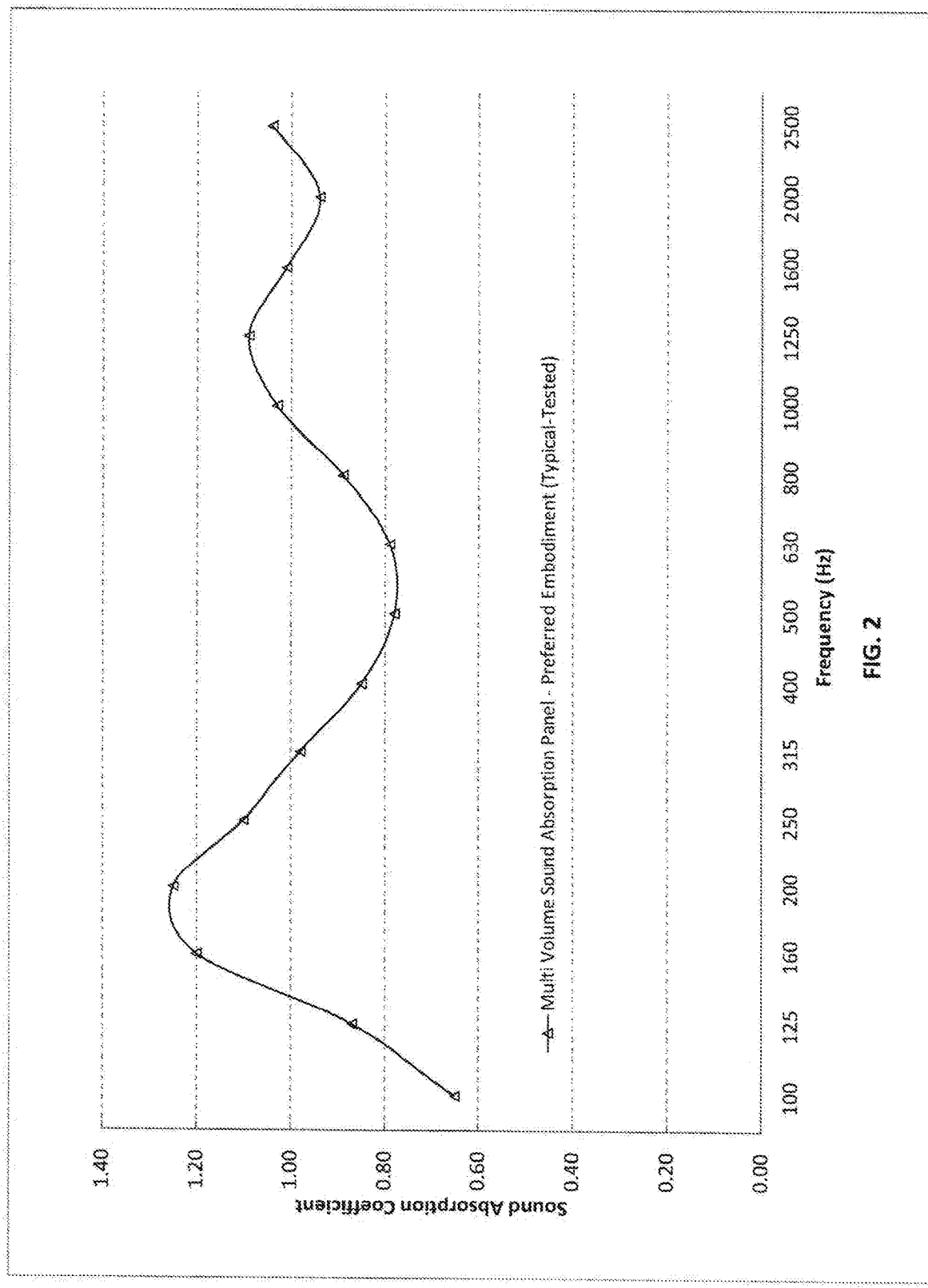
FIG. 2 is an X-Y chart depicting a comparison of a multi-volume sound absorption panel as plotted against frequency.
Figure 4A:
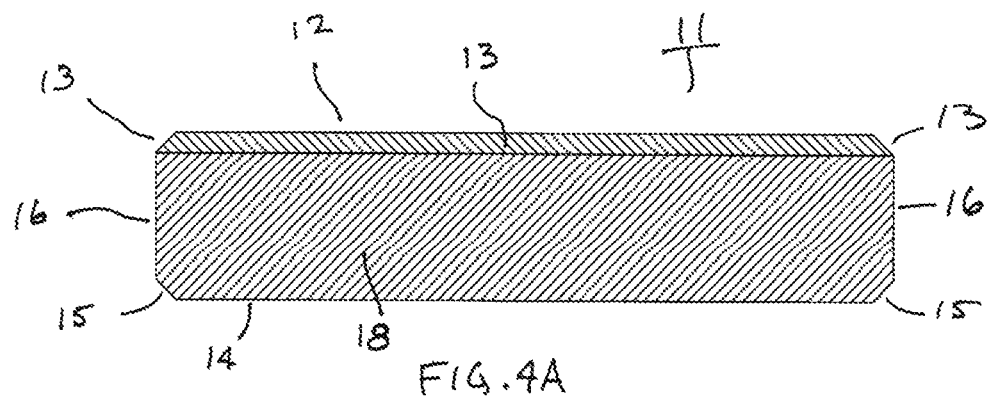
FIG. 4A is an end elevation view depicting a second embodiment of a sound absorption panel.
Figure 4B:
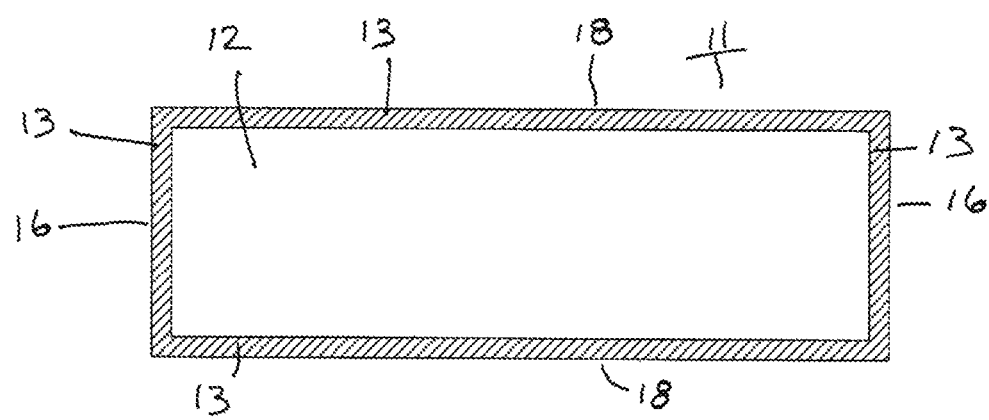
FIG. 4B is a top plane view depicting the sound absorption panel of FIG. 4A.
Figure 4C:
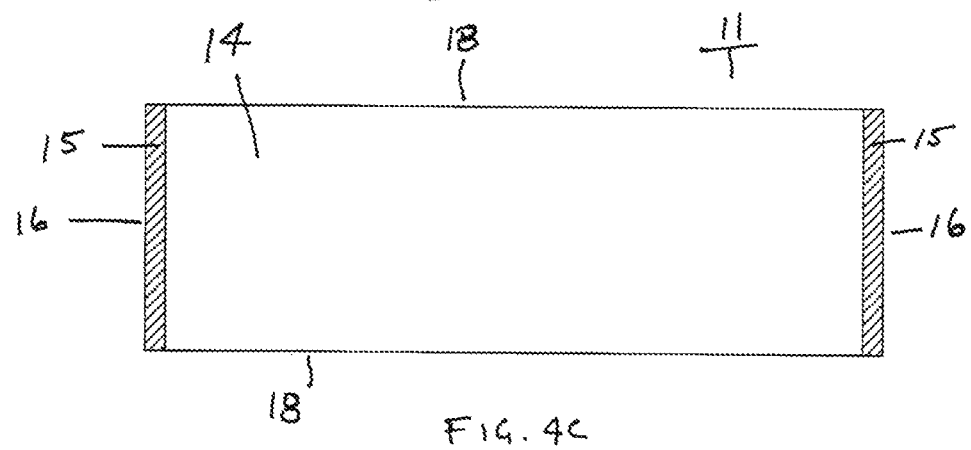
FIG. 4C is a bottom plan view depicting the sound absorption panel of FIG. 4A.
Figure 4D:
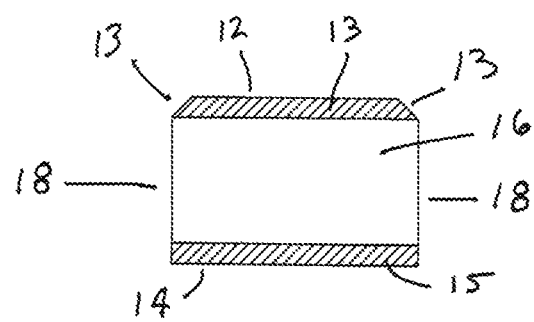
FIG. 4D is a side elevation view depicting the sound absorption panel of FIG. 4A.

Referring to FIG. 2, a sound absorption profile of one embodiment of the sound absorption panel is shown. It can be seen that the peak sound absorption is shifted well below the 250 Hz frequency range, and that the peak absorption is now between 160 and 220 Hz. The NRC=0.95 and SAA=0.98.

In some embodiments, the interaction of multiple sound absorptive materials with multiple resonant frequencies can result in the sound absorption panel performing at least equal to Rockwool™ insulation, with the added unique properties of greater sound absorption at lower frequencies, in addition to being assembled in a durable, practical and cost effective manner for use in exterior applications.

Manufacturing Processes

In some embodiments, the sound absorption panel can be manufactured using known processes of manufacturing loose and wet cement bonded fibre material. The fibre material (the aggregate) can be comprised of wood, rice husks, hemp hurds (ie., shives) and/or any other cellulose material well known to those skilled in the art, which can be chipped into small pieces and treated by various proprietary methods to create a precise chemical environment within the material that facilitates the addition of water and a hydraulic binder (stabilizing agent), wherein the binder can hydrate or harden and then encase the wood fibres to create a hardened matrix of aggregate (wood) and binder (cement). The binder can comprise one or more of Portland Cement™, lime, gypsum, magnesium oxide and any other suitable binder as well known to those skilled in the art.

In some embodiments, the process of chipping the wood is not arbitrary or random. A specific gradation of wood particle size can be selected to create an end product with the desired strength and porosity required in the end product. The gradation can be determined by sieve analysis and measuring the percentage of mass that is retained by each specific sieve/screen size, ranging from 10 mm to less than 1 mm.

The strength of the material can determine the durability and longevity of the end product, while the porosity can determine a variety of other properties including, but not limited to, freeze-thaw resistance, capillary suction, vapour permeability and sound absorption.

The ratio of the ingredients that are mixed together, combined with a measured amount of vibration and resulting compaction of the material during product manufacturing, can determine the final density and porosity of the material in the end product. Density is measured as oven-dry density with all free moisture (i.e. moisture not used in the setting and hardening of the hydraulic binder) removed. Compaction is measured as a compaction ratio of the final material volume to the initial loose material volume when first mixed. A compaction ratio of 0.73 refers to product that has material compacted to occupy 73% of the original loose, wet volume.

For example, if the weight and volume of the ingredients were mixed to create 1 $m^3$ of loose and wet material, after 0.73 compaction, the total volume of material in the end product would then be 1×0.73=0.73 $m^3$.

A. Currently Proposed—Egg Layer Block Machine

Referring to FIGS. 3A to 3D, in some embodiments, one embodiment of sound absorption panel 10 can be manufactured in a multi-step process comprising an "egg layer block machine" system, as described as follows:

Loose wet cement bonded wood fibre material ("CBWF") can be delivered to an "Egg Laying" cement/concrete block machine that comprises a mold box to create the rough desired shape of the end product. Each mold box can contain several individual molds for each individual product. The mold and mold box can determine the dimensions (length, thickness, width and height) of each part of the individual product units.

While the concept of a traditional block machine to manufacture CBWF products is not new, what is novel in this application is the process by which the loose material is filled into the mold. Conventionally and historically, the loose material is placed into a hopper on the block machine. The operator opens the hopper to drop the material onto a sliding tray. The hopper and sliding tray are adjacent to and above the mold box. The tray has slats that are spaced apart such that the material sits on the slats as the tray is moved back and forth over the mold. The jolting action of the tray movement back and forth over the mold box (and hitting/impacting the end of the block machine), knocks the material from the slats into the mold box. The mold box has mechanical vibrators that are triggered during this process to compact the loose material in the mold. The operator drops material on the tray, moves the tray back and forth over the mold box while vibrating the mold box. The tray is returned under the hopper for more material and the procedure is repeated several times as the mold is filled in layers with the vibration. This process is not very controlled; if more material is delivered onto the tray from the hopper, then more material enters the mold from the tray with the first pass over the mold. A hard knock/jolt can deliver more material to the mold. This historical process does not facilitate a controlled, consistent delivery of material into the mold, which in turn will result in a product that has higher variability in compaction and density, both within one individual product unit and from one product unit to another. This process also tends to over-vibrate creating a denser product.

In some embodiments, the tray with slats can be replaced with a mechanical tray. It is in the same position (adjacent to and above the mold box). The new mechanical tray has been termed a "fluffer box". In some embodiments, using the fluffer box in combination with multiple variable hydraulic vibrators traditional egg-layer, lower cement to wood ratios typically seen in the industry can be used. Compaction rations of 0.78 to 0.85 can be obtained, which can achieve more than adequate strength thereby resulting in a lower density but strong CBWF product.

In some embodiments, the fluffer box can comprise a solid floor (i.e. no slats) so that material from the hopper is dropped onto the solid floor of the fluffer box. The fluffer box can be fabricated with a mechanical screed that draws/pushes the loose material to the front of the box that further comprises a row of fast rotating mechanical fingers. As the tray is moved back and forth over the mold, and as the screed brings the material into contact with the rotating fingers, the fingers can take the loose material and "throw" it forward and upward over the mold box, essentially sprinkling the material into the molds in a more consistent manner. The mold box can still be vibrated, but less so. Lighter density materials are now possible without reducing the cement content and strength of the product.

The mold can still be filled in layers and vibrated at intervals over the entire filling process so as to create a consistent material throughout the product.

The block machine and operator can produce one drop of product (the quantity in the mold box). The mold box can be lifted off the concrete floor, then the block machine can be advanced to the next position, then the mold box can be lowered to the floor, where the process can be repeated.

All the blocks/units can be left on the floor and covered with plastic polyethylene sheeting to keep the moisture in the product so that it can cure and harden. Once cured (18+ hours typically), the individual blocks/units can be picked up and stored for further curing, freeing up the production floor for the next days' production.

After curing, the product can then be put through a series of cutting, trimming and planning operations to get the precise dimensions, shape and clean smooth surface desired.

The final step in the process can be to place the lower density material (currently proposed as Rockwool™ mineral fibre insulation) into the cavity of the block/unit.

These blocks/units can be laid flat on one face between the railway rails, one next to the other going down the railway tracks.

The end product dimensions as installed (laid flat on one face) can be limited to lengths (as measured perpendicular to the rails) and widths (as measured parallel with the rails) and heights (as measured vertically from the ground) that are determined by the physical size of the mold box and block machine. As shown in FIGS. 3A to 3D, each panel 10 can cover 305 mm (12") of linear track along the rail line. In some embodiments, instead of using an egg layer machine, sound absorption panel 10 can be manufactured using a stationary block machine system that can be modified in similar manner, but in this manufacturing process, the machine can stay in one place and trays are brought under the mold box. The product can be manufactured on the tray, and then the tray can be taken away and stored in curing racks, while the next tray is brought under the mold box. Thus, in some embodiments, each sound absorption panel 10 can comprise top surface 12, bottom surface 14, side surfaces 16 and end surfaces 18. Disposed through panel 10 can be at least one cavity 20 providing communications from one end surface 18 to the other end surface 18. Insulation material 22, as described herein, can be disposed in at least one cavity 20. In some embodiments, top surface 12 can comprise top chamfers 13 along each top edge of panel 10. In some embodiments, bottom surface 14 can comprise bottom chamfers 15 disposed along side surfaces 16 such that bottom chamfers 15 run substantially parallel to at least one cavity 20. In some embodiments, one or both of top and bottom surfaces 12 and 14 can be planed or ground to create a clean, smooth surface. The use of chamfers on one or both top and bottom surfaces 12 and 14 can relieve mechanical stress along the edges of sound absorption panel 10, thus providing additional structural integrity thereto, in additional to providing a modest reduction to the weight of each panel 10.

Referring to FIGS. 4A to 4D, a solid version of the panels, end panel 11, is shown for use at the ends of a "run" of a plurality of sound absorption panels 10. End panel 11 would be placed at the end of a run so that the insulation disposed in at least one cavity 20 of the adjacent panel 10 would be covered or protected and not be visible or exposed to the elements. In some embodiments, each end panel 11 can comprise top surface 12, bottom surface 14, side surfaces 16 and end surfaces 18. In some embodiments, top surface 12 can comprise top chamfers 13 along each top edge of end panel 11. In some embodiments, bottom surface 14 can comprise bottom chamfers 15 disposed along side surfaces 16 such that bottom chamfers 15 run substantially parallel to at least one cavity 20 disposed through adjacent sound absorption panels 10. In some embodiments, one or both of top and bottom surfaces 12 and 14 can be planed or ground to create a clean, smooth surface. As an example, a run of 30 of panels 10, as shown in FIGS. 3A to 3D, can be laid end to end to achieve a run of, for example, 30×315 mm=9150 mm, where a solid panel 11 can be placed at each end of the run. Another run of panels 10 can then be placed, where each run can be separated by an expansion joint of approximately 50 mm, with the process repeated for as long as needed or required. In some embodiments, a solid panel 11 can be placed on a base, then 30 sound absorption panels 10 can be placed end to end, followed by another solid panel 11. The panels can be glued together, fastened together, glued to the base, fastened to the base, or any combination thereof or by any other means as well known to those skilled in the art to join the panels together and/or affix them to the base. An expansion joint of approximately 50 mm can be placed between adjacent runs of panels.

B. Stationary Block Machine

In some embodiments, instead of using an egg layer machine, the sound absorption panel can be manufactured using a stationary block machine system that can be modified in similar manner, but in this manufacturing process, the machine can stay in one place and trays are brought under the mold box. The product can be manufactured on the tray, and then the tray can be taken away and stored in curing racks, while the next tray is brought under the mold box.

C. Panels

Referring to FIGS. 5A to 5C, in some embodiments, a steel mold can be utilized such that the mold can represent a longer length of linear track. For example, a 10 ft mold can produce product for 3050 mm (10 ft) of track, instead 305 mm (12") of track, making installation of the product more efficient. In some embodiments, each sound absorption panel 10 can comprise top surface 12, bottom surface 14, side surfaces 16 and end surfaces 18. Disposed through panel 10 can be at least one cavity 20 providing communications from one end surface 18 to the other end surface 18. Insulation material 22, as described herein, can be disposed in at least one cavity 20. In some embodiments, top surface 12 can comprise top chamfers 13 along each top edge of panel 10. In some embodiments, bottom surface 14 can comprise bottom chamfers 15 disposed along side surfaces 16 such that bottom chamfers 15 run substantially parallel to at least one cavity 20. In some embodiments, one or both of top and bottom surfaces 12 and 14 can be planed or ground to create a clean, smooth surface. In other embodiments, the mold could produce 15 ft long, or even 20 ft long, panels. The width of the mold can be the width of product required between the 2 parallel rails. In some embodiments, the product can be manufactured in the same orientation as it would be installed. The mold can be comprised of steel or of other materials such as plastics or urethane liners configured to create a pattern in the panel, or of any other suitable material as well known to those skilled in the art.

In some embodiments, the mold can be filled in layers. The bottom of the mold can be the bottom layer of CBWF material. Then, a lower density layer of insulation 22 (such as Rockwool™ insulation) can be placed. In some embodiments, the lower density material would not comprise the same width as the lower layer. The final layer can fill around the sides of the low density material, bonding to the lower layer and creating the sides and top layer of CBWF material at the same time. Alternately, the sides can comprise concrete.

Figure 6A:
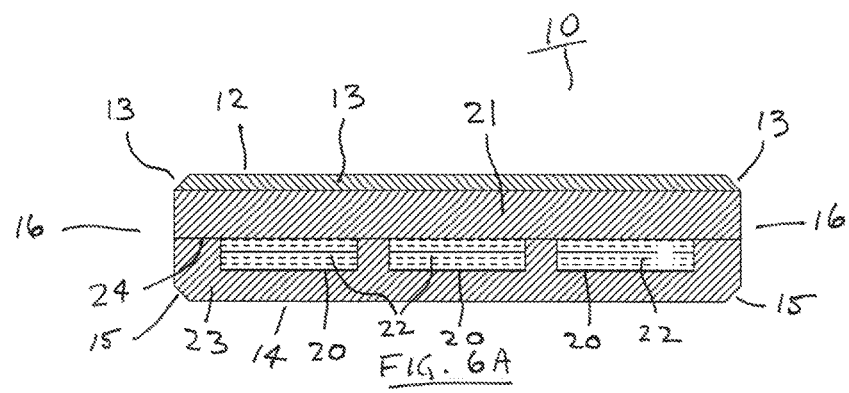
FIG. 6A is an end elevation view depicting a fourth embodiment of a sound absorption panel.
Figure 6B:
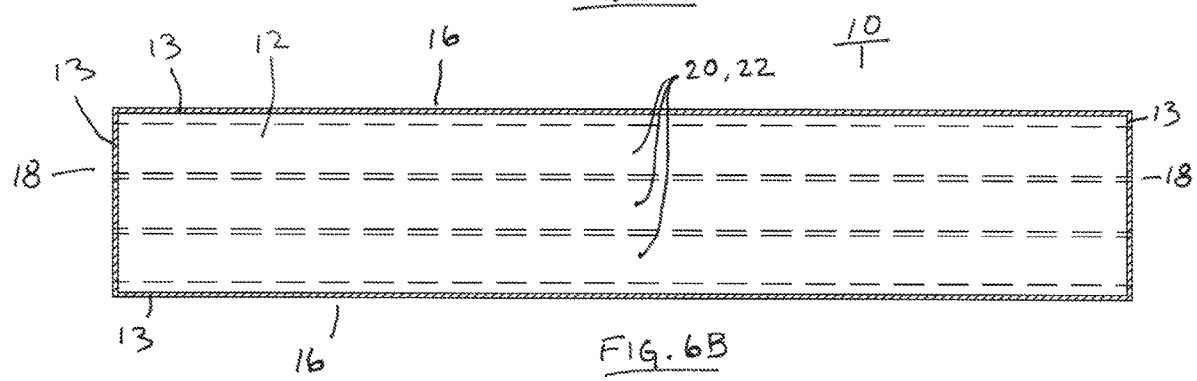
FIG. 6B is a top plan view depicting the sound absorption panel of FIG. 6A.
Figure 6C:
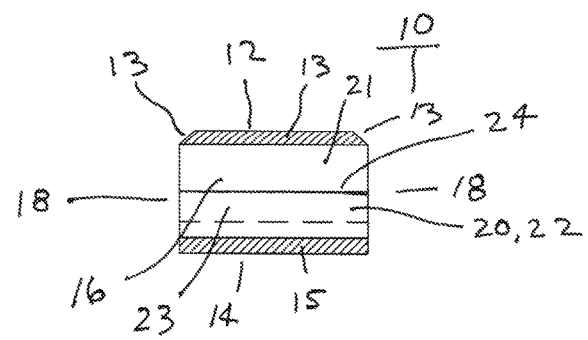
FIG. 6C is a side elevation view depicting the sound absorption panel of FIG. 6A.

Referring to FIGS. 6A to 6C, in some embodiments, the bottom layer can be made separately from the top layer. And then, the layers can be assembled together in a separate process. In some embodiments, each sound absorption panel 10 can comprise of lower layer 23 further comprising at least one channel disposed thereon and therealong thereby forming at least one cavity 20 when upper layer 21 is placed on top of lower layer 23. Each sound absorption panel 10 can comprise top surface 12, bottom surface 14, side surfaces 16 and end surfaces 18. Disposed through panel 10 can be at least one cavity 20 providing communications from one end surface 18 to the other end surface 18. Insulation material 22, as described herein, can be disposed in at least one cavity 20. In some embodiments, top surface 12 can comprise top chamfers 13 along each top edge of panel 10. In some embodiments, bottom surface 14 can comprise bottom chamfers 15 disposed along side surfaces 16 such that bottom chamfers 15 run substantially parallel to at least one cavity 20. In some embodiments, one or both of top and bottom surfaces 12 and 14 can be planed or ground to create a clean, smooth surface. In some embodiments, a further increase in sound absorption can be achieved through introduction of dampening layer 24 comprising a resilient elastic material disposed between upper layer 21 and lower layer 23.

D. Extrusion Process

In some embodiments, the panels described above can be made in an extrusion process similar to how precast hollow core concrete panels are manufactured. Once a panel has been extruded and cured, the hollow cores within the panel can then be filled with insulation/low density material.

In some embodiments, the panels can comprise just be the top layer with side pieces and insulation, without the bottom layer.

Properties of Cement Bonded Wood Fibre Materials and the Effect on Acoustic Sound Absorption While the use of cement bonded wood fibre in acoustic applications is well known, what has not been investigated or published is the effect of various parameters on the sound absorption. Furthermore, each parameter affecting sound absorption can also have an effect on strength and durability. Manufacturing processes can also have limitations and expected tolerances that must be considered, as does cost of materials and cost of manufacturing. Many of these factors can be related and inversely proportional to each other (for example, lower density translates to lower strength whereas greater thickness translates to increased costs). Factors that affect sound absorption can include the following:

Physically measured properties of the End Product
 a. Density
 b. Thickness of layer
Wood Aggregate properties used in manufacturing
 a. Gradation or Size distribution
 b. Shape
 c. Type of wood
Manufacturing parameters and methods
 a. Cement to wood ratio
 b. Compaction Ratio
 c. Method of manufacture of sound absorption panels: i) one integral CBWF piece, or ii) assembled from 2 or more subcomponent pieces. If assembled from 2 or more pieces, the materials used join the pieces together (resilient/elastomeric adhesive, hard concrete, screw/anchors, etc).
 d. Addition of other layers of different materials and/or other layers of CBWF material, and the density and thickness of these layers. It is possible to make a product with hard, higher-density CBWF on the exterior and a lower density CBWF material on the interior.

Density

Referring to FIG. 7, a plot of sound absorption coefficient versus frequency for various densities of CBWF is shown. In some embodiments, 540 kg/m$^3$ can be identified as the target oven-dry density. It is considered to be the minimum density of CBWF to maintain strength and durability. Current manufacturing tolerances in the industry for CBWF are typically +10%, −5%.

Thickness

Figure 8:
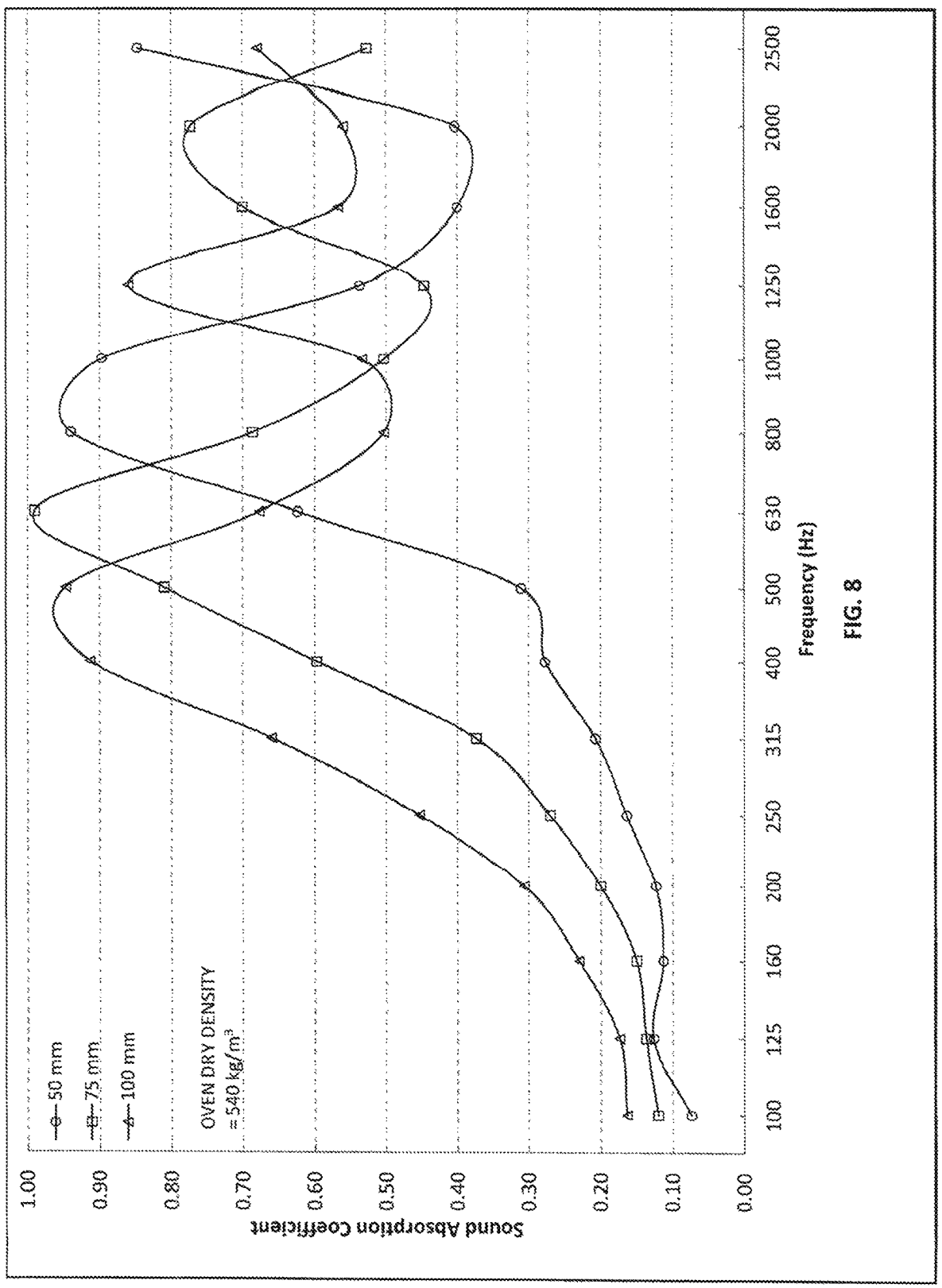
FIG. 8 is an X-Y chart depicting a comparison of sound absorption coefficients of three different thicknesses of cement bonded wood fibre.

Referring to FIG. 8, a plot of sound absorption coefficient versus frequency for various thicknesses of CBWF is shown, where the CBWF has a density of 540 kg/m$^3$. In some embodiments, thicker samples of CBWF can shift the peak of it sound absorption coefficient to lower frequencies. In some embodiments, maximum NRC can occur at 100 mm of thickness of CBWF. In some embodiments, thicknesses greater than 100 mm do not significantly improve in either lowering the frequency of the peak sound absorption coefficient, or lowering the overall NRC.

Different Inner Volume Material

In some embodiments, any sound absorptive insulation or material as known to those skilled in art can be used in the various embodiments of the sound absorption panel described herein. In some embodiments, a very light density version of CBWF can be filled into the cavities. In some embodiments, the density of such CBWF can be in the range of 480 kg/m$^3$ to 460 kg/m$^3$ possibly, lower. In some embodiments, the panels can be manufactured with their cavities filled with loose, un-vibrated CBWF having even lower cement to wood ratios one day after being molded so that the heavier and lighter density CBWF can still bond to each other.

In respect of applications of the sound absorption panel to reduce railway traffic noise, in some embodiments, the sound absorption panel can be placed along railway tracks that comprise a concrete base (that is, no wooden railway ties) by simply laying sound absorption panels on the concrete base between the rails, either not affixed to the concrete base at all, or affixed to the concrete base with adhesive, clips, fasteners, screws, etc. as well known to those skilled in the art.

Referring to FIGS. 9A to 9C, one embodiment of how sound absorption panels 10 can be installed along a railway track 26 is shown. In this embodiment, a plurality of 915 mm wide panels 10 can be placed end to end on base 30 along the railway track 26 between the two rails 28 of railway track 26 and attached thereto with fasteners 32, which can comprise one or more of adhesive, screws and clips as well known to those skilled in the art, where the axes of at least one cavity 20 can run parallel to railway track 26. The panels 10 can be joined together with fasteners 34, which can comprise one or more of adhesive, screws and clips as well known to those skilled in the art.

In embodiments where sound absorption panels 10 are placed on railway tracks 26 where the rails 28 are placed on railway ties, and not on a concrete base 30, the length of the panels 10 can be selected to span a minimum of 3 railway ties to ensure that the panels are stable on the railway ties.

A leveling layer between the railway ties and the panels 10 may be required to ensure that the stability of the panels once installed.

Figure 10A:
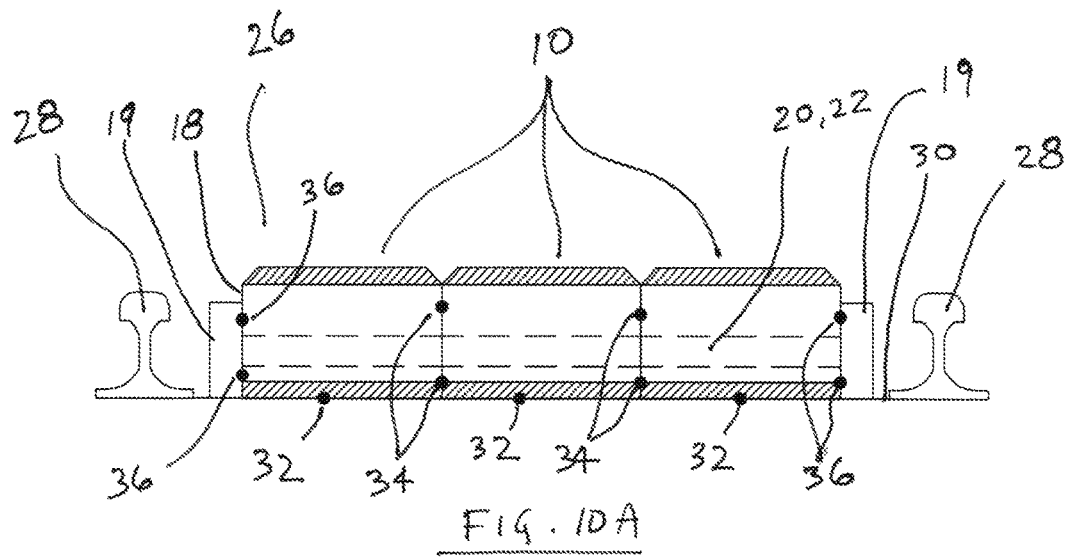
FIG. 10A is an end elevation view depicting one embodiment of a plurality of the sound absorption panel of FIG. 3A installed along between two rails along a railway track, where the axes of the cavities within the panel run perpendicular to the railway track.
Figure 10B:
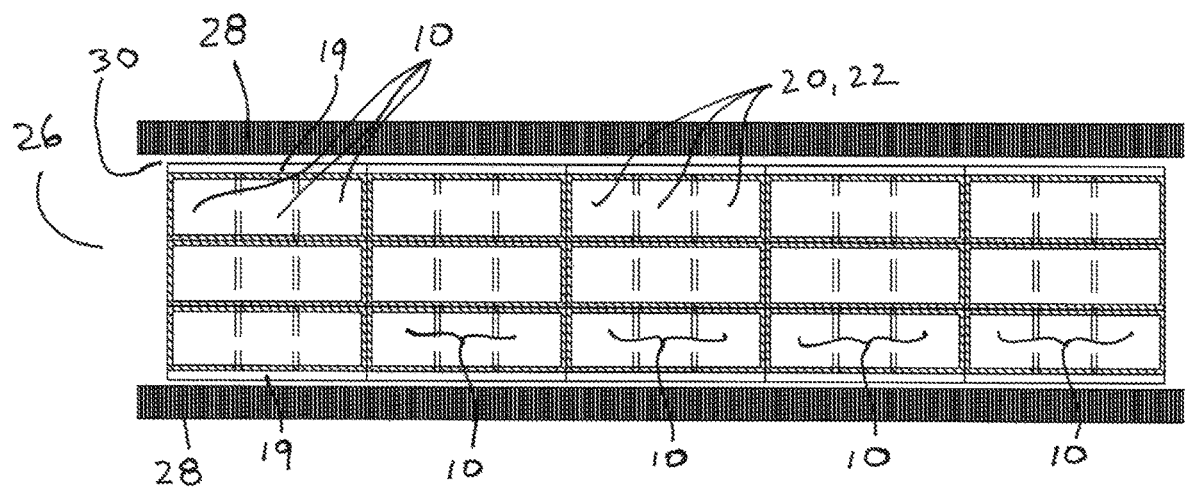
FIG. 10B is a top plan view depicting the sound absorption panel of FIG. 10A.
Figure 10C:
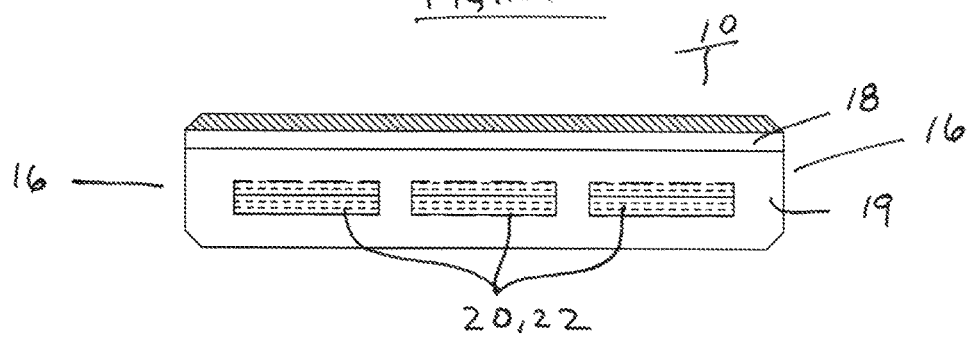
FIG. 10C is a side elevation view depicting the sound absorption panel of FIG. 10A.
Figure 11A:
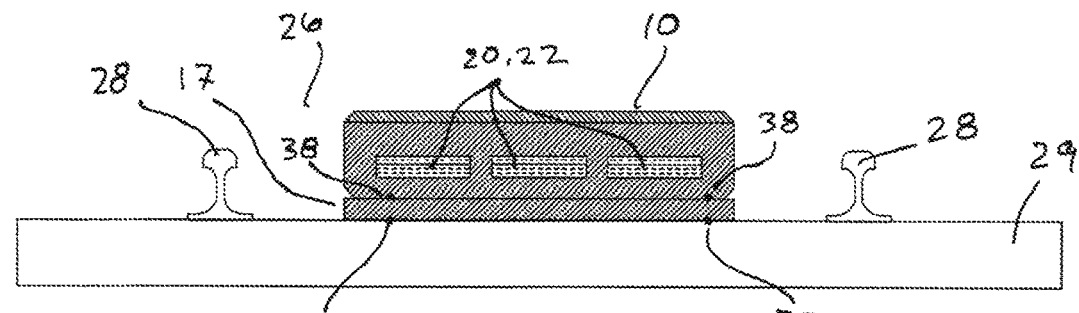
FIG. 11A is an end elevation view depicting an alternate embodiment of the sound absorption panel of FIG. 3A installed on a plurality of base panels disposed along a railway.
Figure 11B:
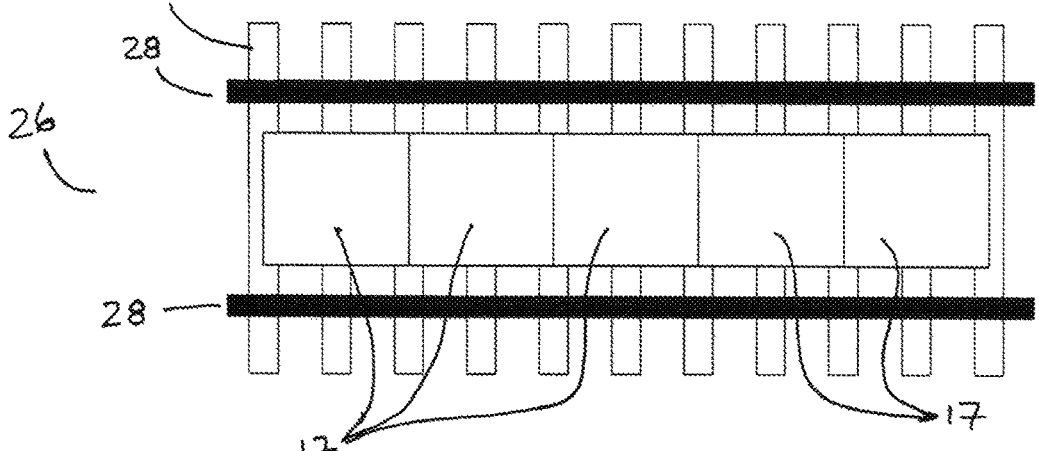
FIG. 11B is a top plan view depicting the base panels disposed along the railway of FIG. 11A.
Figure 11C:
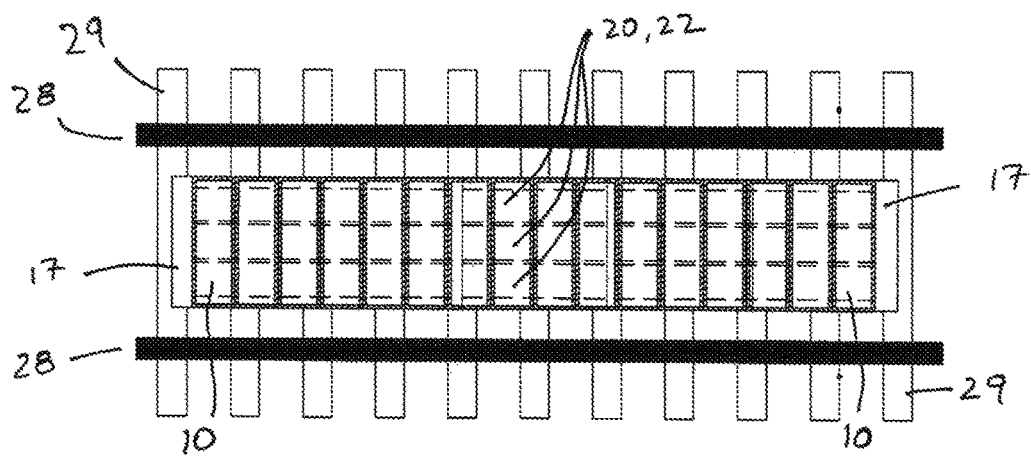
FIG. 11C is a top plan view depicting the railway of FIG. 11B with the sound absorption panels disposed on the base panels.
Figure 11D:
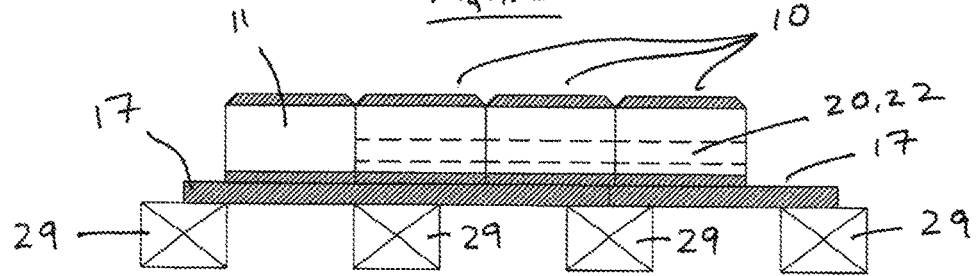
FIG. 11D is a side elevation view depicting the sound absorption panels of FIG. 11C.

Referring to FIGS. 10A to 10C, another embodiment of how sound absorption panels 10 can be installed along a railway track 26 is shown. In this embodiment, a plurality of 915 mm wide panels 10 can be placed in a grid formation on base 30 along railway track 26 between the two rails 28 of railway track 26, where the axes of at least one cavity 20 can run perpendicular to the path of railway track 26. The exposed cavities of panels 10 can be covered with sidewall panel 19, which can be comprised of CBWF. Fasteners 32, 34 and 36, which can comprise one or more of adhesive, screws and clips as well known to those skilled in the art, can be used to join the panels and sidewall pieces together as well as to secure the panels to concrete base 30.

Referring to FIGS. 11A to 11D, an alternate embodiment of the sound absorption panel 10 of FIGS. 3A to 3D is shown for use on railway lines where railway ties are used instead of a solid concrete base. In this embodiment, base panel 17 can disposed on top of railway ties 19 where base panel 17 can comprise a length such that it can span a minimum of 3 railway ties to ensure that the panel is stable on the railway ties. An additional leveling layer between railway ties 19 and base panels 17 may be required to ensure that the stability of the panels once installed. Base panels 17 can be attached to railway ties 19 with fasteners 32, which can comprise one or more of adhesive, screws and clips as well known to those skilled in the art. A plurality of the sound absorption panels 10 of FIGS. 3A to 3D can then be placed on top base panels 17 and attached thereto with fasteners 38, with fasteners 34 being used to fasten adjacent sound absorption panels 10 together. Fasteners 34 and 38 can each comprise one or more of adhesive, screws and clips as well known to those skilled in the art. As shown in FIG. 9C, end panels 11 can be used at the ends of a "run" of a plurality of sound absorption panels 10. In some embodiments, end panel 11 can be placed at the end of a run of sound absorption panels 10 so that the insulation disposed in at least one cavity 20 of the adjacent panel 10 would be covered or protected and not be visible or exposed to the elements.

Referring to FIGS. 12A to 12D, an alternate embodiment of the sound absorption panel 10 of FIGS. 6A to 6C is shown for use on railway lines where railway ties are used instead of a solid concrete base. In this embodiment, lower panel 44 can disposed on top of railway ties 19 where base panel 44 can comprise a length such that it can span a minimum of 3 railway ties to ensure that the panel is stable on the railway ties. An additional leveling layer between railway ties 19 and base panels 44 may be required to ensure that the stability of the panels once installed. Base panels 44 can be attached to railway ties 19 with fasteners 32, which can comprise one or more of adhesive, screws and clips as well known to those skilled in the art. A plurality of upper panels 42 can then be placed on top base panels 44 to form absorption panel 10, with upper panel 42 being attached to lower panel 44 with fasteners 46, which can each comprise one or more of adhesive, screws and clips as well known to those skilled in the art. Upper panels 42 can comprise at least one channel disposed on a bottom surface thereof so as to form at least cavity 20 when upper panel 42 is placed on top of lower panel 44. As shown in FIG. 9C, end panels 11 can be used at the ends of a "run" of a plurality of sound absorption panels 10. In some embodiments, a further increase in sound absorption can be achieved through introduction of dampening layer 24 comprising a resilient elastic material disposed between upper layer 42 and lower layer 44. In some embodiments, end panel 11 can be placed at the end of a run of sound absorption panels 10 so that the insulation disposed in at least one cavity 20 of the adjacent panel 10 would be covered or protected and not be visible or exposed to the elements.

In respect of applications of the sound absorption panel as a sound barrier to reduce vehicular traffic noise along highways, in some embodiments, sound absorption panels can be placed between spaced-apart steel posts positioned along the highway. In such embodiments, the panels can comprise a sound absorptive face on one or both sides of the front and rear face of the panels. The front face (facing towards the highway) can either comprise a textured surface, reliefs, etc. or not. The core of the panels can comprise concrete to provide structural strength to withstand lateral wind loading on the panels and to transfer loads onto the steel posts. In some embodiments, the panels can comprise a structural layer to provide structural strength and can be disposed either within the panel or behind it adjacent to the rear face of the panel. In some embodiments, the sound absorption panels can be assembled or disposed within a structural frame. In some embodiments, the sound absorption panel can comprise a multi-cell block wherein one or more cells comprising insulation, and one or more cells comprising concrete.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

What is claimed is:

1. A sound absorption panel system for absorbing railway or vehicular traffic noise, the sound absorption panel system comprising:
 a plurality of sound absorbing panels configured to be disposed adjacent to each other in an end to end configuration, wherein each of the sound absorbing panels comprises:
  a) a three-dimensional block of a first sound absorbing material comprising a first density, the three-dimensional block further comprising a pair of outermost opposing external end surfaces wherein one outermost end surface of one panel of the plurality of sound absorbing panels is configured to be disposed substantially aligned and adjacent to an adjoining outermost end surface of another panel of the plurality of sound absorbing panels;
  b) at least one cavity disposed through the block, wherein the at least one cavity provides fluid communication from one of the pair of outermost opposing external end surfaces to another of the pair of outermost opposing external end surfaces; and
  c) a second sound absorbing material of a second density disposed in the at least one cavity, wherein the second density is less than the first density;
 and wherein each of the sound absorbing panels is configured such that each respective first sound absorbing material protects each respective second sound absorbing material from an ambient exterior weather exposure when absorbing railway or vehicular traffic noise and wherein the at least one cavity spans between the pair of outermost opposing external surfaces through the three-dimensional block such that the plurality of sound absorbing panels are in fluid communication with each other via their respective cavities when the plurality of sound absorbing panels are disposed adjacent to each other in the end to end configuration.

2. The sound absorption panel system as set forth in claim 1, wherein the block comprises a thickness in a range of about 50 mm to about 100 mm adjacent to the at least one cavity.

3. The sound absorption panel system as set forth in claim 1, wherein the first sound absorbing material comprises one or more of concrete and cement bonded wood fibre ("CBWF").

4. The sound absorption panel system as set forth in claim 3, wherein the CBWF comprises a density of about 520 kg/m$^3$.

5. The sound absorption panel system as set forth in claim 1, wherein the first sound absorbing material comprises a first noise reduction coefficient equal to about 0.4.

6. The sound absorption panel system as set forth in claim 5, wherein the second sound absorbing material comprises one or more of stone wool, mineral wool, fibreglass insulation, and CBWF.

7. The sound absorption panel system as set forth in claim 6, wherein the second sound absorbing material comprises a second noise reduction coefficient equal to about 1.

8. The sound absorption panel system as set forth in claim 1, further comprising a first end panel disposed adjacent the end surface of a sound absorbing panel of the plurality of sound absorbing panels.

9. The sound absorption panel system as set forth in claim 8, wherein the sound absorbing panel of the plurality of sound absorbing panels is a first sound absorbing panel, and further comprising a second end panel disposed adjacent the end surface of a last sound absorbing panel of the plurality of sound absorbing panels, wherein the last sound absorbing panel is other than the first sound absorbing panel.

10. The sound absorption panel system as set forth in claim 1, wherein the system comprises a sound absorption coefficient of about 0.8 between about 125 hertz and about 450 hertz.

11. The sound absorption panel system as set forth in claim 1, further comprising a structural frame.

12. The sound absorption panel system as set forth in claim 1, further comprising a structural frame configured to be disposed adjacent to at least one of the plurality of sound absorbing panels.

13. The sound absorption panel system as set forth in claim 1, wherein at least one of the plurality of sound absorbing panels is configured to be disposed within a structural frame.

14. The system as set forth in claim 1, wherein the second sound absorbing material extends between the pair of end surfaces.

15. The system as set forth in claim 1, wherein the three-dimensional block comprises two or more layers or panels.

16. A method of manufacturing a sound absorbing panel, for use in a sound absorption panel system that comprises a plurality of sound absorbing panels, the method comprising:
    molding one or more blocks in a mold, each block having a pair of end surfaces, to form a first sound absorbing material comprising a first density, wherein each sound absorbing panel is formed from
    1. a moulded block having at least one cavity disposed through the block between the pair of end surfaces, or
    2. two or more blocks assembled to form the panel, the assembled panel having at least one cavity disposed through the block between the pair of end surfaces; and
    wherein a second sound absorbing material, having a second density less than the first density, is disposed in the at least one cavity thereby being environmentally protected by the first sound absorbing material and
    wherein the mold is filled in layers, comprising at least a bottom layer of the first sound absorbing material, a layer of the second sound absorbing material having a width less than the width of the first sound absorbing material, and a further layer of the first sound absorbing material to fill around the sides of the second sound absorbing material and on top of the second sound absorbing material to create a top layer of first sound absorbing material.

17. The method as set forth in claim 16 wherein the first sound absorbing material is formed from wet bonded fibre material that comprises a mixture of fibre material and binder.

18. The method as set forth in claim 16 wherein the assembled panel comprises a first layer with at least one channel disposed therealong between the pair of end surfaces.

19. The method as set forth in claim 18 wherein the assembled panel further comprises a second layer placed therealong the first layer thereby forming the at least one cavity.

20. The method as set forth in claim 16 wherein the second sound absorbing material is disposed into the channel prior to assembly.

21. The method as set forth in claim 16 wherein the second sound absorbing material is disposed into the cavity after the cavity is formed.

* * * * *